US007263471B2

(12) United States Patent
Barbaresi et al.

(10) Patent No.: US 7,263,471 B2
(45) Date of Patent: Aug. 28, 2007

(54) SYSTEM AND METHOD FOR STIMULATING THE BEHAVIOR OF A NETWORK FOR MOBILE RADIO APPARATUS

(75) Inventors: Andrea Barbaresi, Turin (IT); Andrea Buldorini, Turin (IT); Giorgio Calochira, Turin (IT); Paolo Goria, Turin (IT); Claudio Guerrini, Turin (IT); Saverio Nannicini, Turin (IT); Davide Sorbara, Turin (IT); Enrico Zucca, Turin (IT)

(73) Assignee: Telecom Italia S.p.A., Milan (IT)

( * ) Notice: Subject to any disclaimer, the term of this patent is extended or adjusted under 35 U.S.C. 154(b) by 399 days.

(21) Appl. No.: 10/480,898

(22) PCT Filed: Jun. 12, 2002

(86) PCT No.: PCT/IT02/00385

§ 371 (c)(1),
(2), (4) Date: Feb. 17, 2004

(87) PCT Pub. No.: WO02/104055

PCT Pub. Date: Dec. 27, 2002

(65) Prior Publication Data

US 2004/0172231 A1    Sep. 2, 2004

(30) Foreign Application Priority Data

Jun. 14, 2001   (IT)  ........................... TO2001A0568

(51) Int. Cl.
*G06F 17/50* (2006.01)
*G06F 11/00* (2006.01)
*H04B 1/38* (2006.01)

(52) U.S. Cl. ........................ 703/2; 455/423; 455/428; 714/26

(58) Field of Classification Search .................... 703/2, 703/13; 709/222; 714/26; 370/351; 455/428, 455/561, 67.11, 423

See application file for complete search history.

(56) References Cited

U.S. PATENT DOCUMENTS 5,561,841 A    10/1996  Markus
5,726,979 A    3/1998  Henderson et al.

(Continued)

OTHER PUBLICATIONS

Innovative Network Modeling and Simulation Tool by G. V. Fink (IEEE May 1994).

(Continued)

*Primary Examiner*—Thai Phan
(74) *Attorney, Agent, or Firm*—Andrew Wilford (57) ABSTRACT

The behavior of a network for mobile ratio apparatuses is simulated in a work station having a data input capable of inserting data representative of a network scenario, a data output capable of making available data representative of results of the simulation of the network, and a simulation environment associated with the computer and capable of simulating the network on the basis of the network scenario and of generating and sending to the data outputs the data representative of the results. This environment has first objects representative of devices and/or physical elements belonging to the network to be simulated and second objects representative of processing modules separate from the first objects and capable of conditioning and activating the first objects on the basis of the network scenario to simulate the network.

14 Claims, 5 Drawing Sheets

U.S. PATENT DOCUMENTS

| | | | |
|---|---|---|---|
| 5,794,128 A * | 8/1998 | Brockel et al. | 455/67.11 |
| 5,809,282 A | 9/1998 | Cooper et al. | |
| 6,012,152 A * | 1/2000 | Douik et al. | 714/26 |
| 6,134,514 A | 10/2000 | Liu et al. | |
| 6,272,341 B1 * | 8/2001 | Threadgill et al. | 455/428 |
| 2003/0008684 A1 * | 1/2003 | Ferris | 455/561 |
| 2003/0033394 A1 * | 2/2003 | Stine | 709/222 |
| 2004/0246940 A1 * | 12/2004 | Kubler et al. | 370/351 |

OTHER PUBLICATIONS

Netmate: A Network Management Environment by A. Dupuy et al. (IEEE 1991).

* cited by examiner

SYSTEM AND METHOD FOR STIMULATING THE BEHAVIOR OF A NETWORK FOR MOBILE RADIO APPARATUS

CROSS REFERENCE TO RELATED APPLICATIONS

This application is the U.S. national phase of PCT application PCT/IT02/00385, filed 12 Jun. 2002, published 27 Dec. 2002 as WO 2002/104055, and claiming the priority of Italian patent application TO2001A000568 itself filed 14 Jun. 2001.

FIELD OF THE INVENTION

The present invention is related to a system for simulating the behavior of a telecommunications network for mobile radio apparatuses or cellular telephones and to the relating method of simulating the behavior of this type of networks.

In particular the present invention is related to a system in which it is possible by means of a computer to check beforehand the behavior of the network with respect to the different scenarios defined from time to time and without the need of performing field trials.

BACKGROUND OF THE INVENTION

As is well known, with the evolution of telecommunications, networks for cellular phones become more and more complex, and consequently it becomes more difficult to verify the behavior of such networks, taking into account the various possible scenarios, represented for instance by the number and type of apparatuses being used, typology of available services and time distribution of such services.

It is also known that with the evolution of telecommunications various types of systems for cellular telephones are available on the market, such as the GSM (Global System for Mobile Communications), GPRS (General Packet Radio Service) system and the UMTS (Universal Mobile Telecommunications System), and different technological implementations, such as those represented by apparatuses of different manufacturers, and that, therefore, the choice among various alternatives of scenarios which as such is already difficult for a same type of network, becomes even more complex if it is to be made taking into account different systems and different technological solutions.

The evaluation of complex scenarios and the choice among alternatives of different systems and technologies have always been faced by the present art in a partial way, that is through simulation environments (simulators) either lacking, of modularity or applicable to contexts of limited complexity only or applicable to only a typology of system or technology.

For instance, general purpose simulators are known which, even if theoretically capable of simulating different networks, have on the other hand the strong limitation of not being able to simulate networks characterized by a high complexity in terms of quantity of apparatuses, because, due to their architectural structure, they cannot be practically used in such contexts.

As a matter of fact, owing to the definition modalities of the network scenario to be simulated, usually performed through uncompiled files (i.e. files that have to be interpreted by the system), general-purpose simulators require exponentially increasing simulation times as a function of the network complexity in terms of number of apparatuses.

There are known as well simulators of "custom" type, developed for instance by research establishments that are capable of simulating complex networks in terms of number of apparatuses, however structured with specifically optimized architectures for the simulation of problems or specific systems or specific technologies of a particular manufacturer, and therefore they cannot be used for the simulation of different networks of different technology.

In essence, the instruments known so far are inadequate to meet the twofold requirement of simulating complex networks in terms of quantity of apparatuses and network type, and of comparing, through simulation, the behavior of such networks within the different technological contexts as a function of the services being offered.

As a matter of fact, the instruments available so far meet, to a limited extent only, one of the two requirements above, thus making only partially possible the use of the same simulators and requiring from time to time to resort to field measurements for result accuracy check or to use a plurality of simulators for the analysis of the various operation characteristics of the networks as the possible situations vary.

OBJECT OF THE INVENTION

The technical problem the present invention aims to face and solve, is that of implementing a unique simulator for cellular telephone networks which by virtue of an appropriate type of architecture and of an innovative approach in the management of the different possible scenarios, allows simulating and comparing various networks characterized by a different complexity and a different technology with extremely short processing times.

In particular, according to a characteristic of the present invention, the system has a modular structure based on interchangeable objects and capable of simulating high complexity networks in terms of quantity of apparatuses.

Furthermore, the system may be used for simulating different protocol layers and is easily expandable as a function of the types of cellular telephone systems and of the technological implementations available on the market.

Moreover, the system allows the simulation of networks where different cellular telephone systems are operating, such as GSM, GPRS and/or UMTS, and/or different technological implementations, and an easy comparison of their performance.

BRIEF DESCRIPTION OF DRAWINGS

This and other characteristics of the present invention will become evident from the following description of a preferred embodiment, given by way of a non-limiting example through the attached drawings, wherein.

SPECIFIC DESCRIPTION

Figure 1:
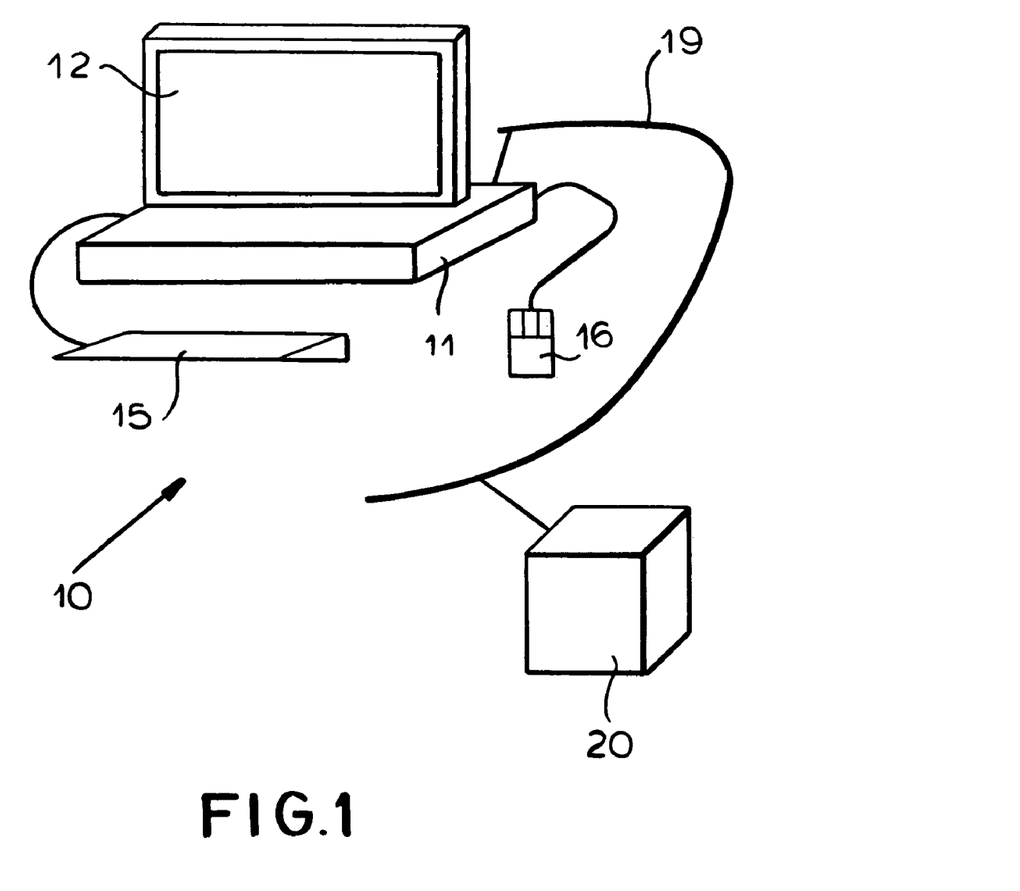
FIG. 1 depicts a processing system for simulating the behavior of a network for mobile radio apparatuses according to the invention.

With reference to FIG. 1, a processing system for simulating the behavior of a network of mobile radio telecommunications apparatuses comprises for instance a work station 10 of known type having a processing sub-system (basic module) 11, a display 12, a keyboard 15, a mouse 16 and a device 19 for connection to the local network.

The work station 10, for example the J5000 model by Hewlett-Packard equipped with a 450 MHz CPU, a 1 Gbyte RAM, a 18 Gbyte Disk Unit (HD) and operating system of UNIX type, is capable of processing sets of programs or modules and of displaying the results on the display 12, as will be described later in detail with reference to the method according to the present invention.

The system according to this invention further comprises a disk-subsystem, 20 of known type linked through a net connection 19 to the work station 10 and capable of containing, adequately stored, computer modules that are implemented for performing the method according to the present invention, and reference data banks, as will be described in detail below. Obviously, data banks and modules may also be stored, if of a limited size, in the HD of the work station 10, without changing the characteristics of the invention.

In the herein-described configuration, the system allows the simulation of a mobile radio network through configuration parameters 35 (FIGS. 1 and 2) that are capable of defining a particular scenario to be simulated, and a simulation environment (simulator) 30, that can process and generate its output data representative of the results of the performed simulation (output data) 37, as will be later described in detail.

Figure 2:
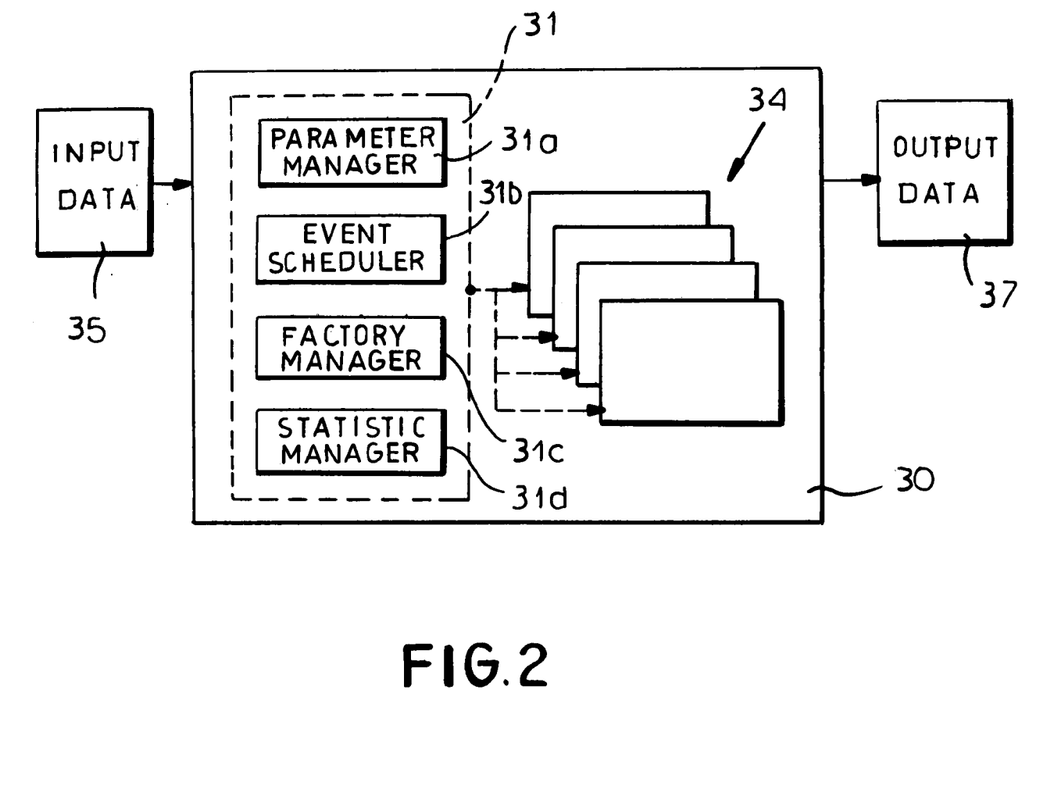
FIG. 2 shows the architecture of the simulation environment according to the invention.

The simulator 30, developed for instance in the programming language C++ and through a design platform UML (Unified Modelling Language), of known type, incorporates, according to an approach by objects, a simulator engine 31, formed by classes and modules that allow managing and organizing the simulation, and a plurality of package devices, 34, formed by classes and modules, relating to both individual physical devices of the telecommunications network to be simulated, such as, for instance, mobile terminals or radio base-stations, and physical elements of the network, such as, for instance, radio-link paths.

According to the present embodiment, engine 31 is able to control and manage the simulation and comprises a set of processing modules which can be activated from time to time as a function of the specific simulation requirements. the modules are, for instance, a parameter manager 31a, an event scheduler 31b, a memory or factory manager 31c, and a statistic manager, 31d, and are all described in a known programming language, such as the C++ language, and according to an approach by objects.

Parameter manager 31a is a processing module capable of reading the configuration parameters (input data) 35, gathered for instance in a data file and stored in the internal disk unit of the work station 10, and of organizing in the RAM of the same work station, 10, the parameters that have been read.

Thus, parameter manager 31a is capable of initializing the simulation, making available to the various devices to be simulated, the parameters read from the input data 35.

Event scheduler 31b is a processing module capable of scheduling asynchronous events, typical of a telecommunications network, such as for instance telephone calls, data transfer requests, and so on.

In particular, such event scheduler 31b performs the queuing of the events as they are generated by the various devices, and the extraction of the same events, duly sorted according to the defined scheduling (timestamp).

For instance, for each extracted event, event scheduler 31a performs the following operations, namely:
  it sets the present time of the simulation on the event timestamp,
  it carries out the event invoking the destination device of the event;
  it provides the extraction of an additional event.

Event scheduler 31b acts in the way described above until either a simulation time limit predefined within the scenario is reached or there are no longer events to be extracted. In essence, on the basis of the above description, event scheduler 31b is capable of simulating by successive steps the time evolution of a telecommunications network for mobile radio apparatuses.

Factory manager 31c is a processing module capable of optimizing the allocation of objects to be simulated 34, in the RAM of the work station 10.

In particular, factory manager 31c co-operates with event scheduler 31b so as to hold in the memory for a determined period and for the purpose of a possible re-use, the events already used by event scheduler 31b.

Statistic manager 31d is a processing module capable of gathering and processing statistics in a centralized manner, on the basis of data collected through the various devices 34 during the simulation.

In particular, statistic manager 31d is capable of extracting data from the objects configured or allocated in the RAM of the work station 10, and of storing and/or processing them in order to provide in output the output data 37 corresponding to the simulation result.

For instance, statistic manager 31d is capable of processing the data corresponding to the events being simulated and of providing them on its output as output data 37 in the form of information to be visualized on display 12 of the work station 10 or of a file to be printed.

Package device 34 (FIGS. 2, 3, and 4) comprises devices representative of physical devices of the network, such as mobile radio stations or MS 41, radio base stations or BTS 51, control stations or BSC, SGSNs (Serving GPRS Support Node), GGSNs (Gateway GPRS Support Node) and HOST stations, and objects relating to the scenario to be simulated, such as for instance type of territory, typology and location of buildings, traffic density, and so on, all described in a programming language of known type, for instance, in C+++ and according to an approach by objects.

Hereafter there are described and depicted in FIGS. 3 and 4, respectively, and by way of an example, the devices MS 41 and BTS 51, keeping in mind that the additional devices which form the network for mobile radio apparatuses and are not shown, can be generated and simulated in a way similar to what is described below.

The generic device MS 41 comprises, according to the present embodiment, a module for a mobility management (Mobility module) 40, a class representative of the device "terminal of GSM type" so configured as to emulate the behavior specific of a cellular telephone (mobile radio terminal or mobile terminal) of GSM type (device GSM_MS) 41a and a class representative of the device "terminal of GPRS type", configured to emulate the behavior specific of a cellular phone of GPRS type (device GPRS_MS) 41b.

Mobility module 40 is capable of managing the events relating to the mobility, i.e. is capable of simulating the displacement of the mobile, causing the variation of the positioning coordinates of the same as a function, for instance, of appropriate parameters being part of the input data 35.

Device GSM MS, 41a comprises modules representative of protocol layers managed by such a device.

In particular, device GSM MS 41a comprises modules representative of the protocol of physical layer (GSM_ms_PHY) 42A, able to simulate the transfer of information, for instance, on a Time Slot (TS) at a time, a module representative of the RR protocol layer (GSM_ms_rr) 43a and a module representative of the application layer protocol or a voice traffic generator module (GSM_MS_VCG) 49a, as will be described in detail, making reference to FIG. 3, denoted by the UML symbology of known type.

The GSM_MS_PHY module 42a can implement the physical layer functionalities of the GSM mobile terminal according to the specifications of the GSM Standard.

For instance, module GSM MS_PHY 42a is capable of simulating the transmission of electromagnetic signals from the mobile terminal to the Radio Base Station through events that comprise, for instance: transmitted power level, transmission frequency used, and time slots used, etc.

Module GSM MS_RR 43a is capable of simulating the functionalities foreseen by the RR layer of the GSM protocol which corresponds to the management of the radio resource, according to the GSM specification of known type.

For instance, module GSM MS_RR, 43a, is able to exchange information with the lower and higher layers of the GSM protocol, as described in the specification.

Module GSM_MS_VCG, 49a, is capable of simulating the calls the mobile terminal has to effect.

In particular, module GSM_MS_VCG, 49a, is capable of producing voice calls with a duration depending upon appropriate parameters defined in the input data 35; for example, module GSM_MS_VCG 49a, is capable of simulating voice calls of a duration which is variable and dependent on an average duration value, defined in the input data 35.

Device GPRS MS, 41b, comprises likewise modules representative of the protocol layers managed by such type of device.

Figure 3:
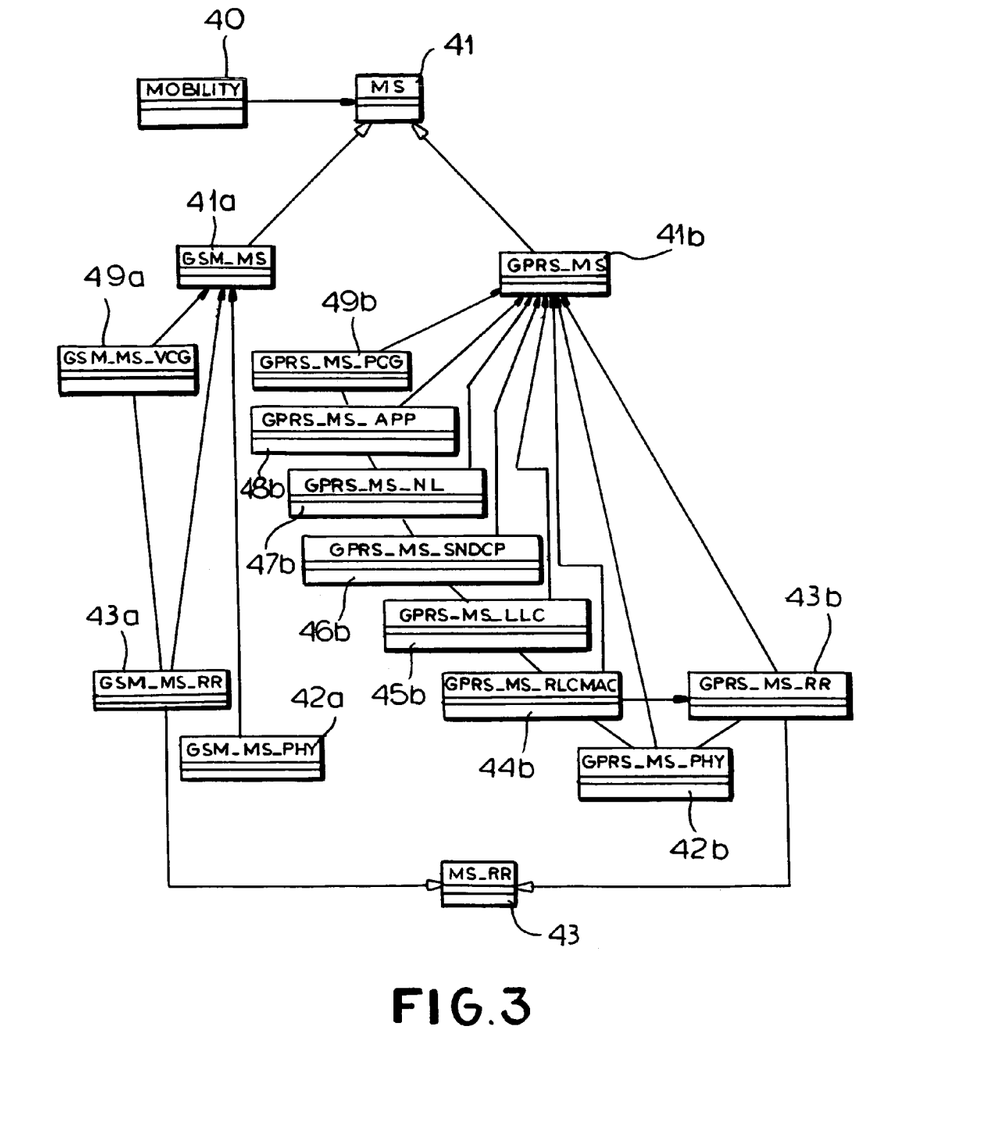
FIGS. 3 and 4 show, according to a symbology of UML Unified Modelling Language) type, classes of devices incorporated in the architecture of FIG. 2.

In particular the above-cited GPRS_MS device 41b incorporates; a module representative of the physical layer protocol (GPRS_MS_PHY) 42b, able to operate, for instance, on a maximum of 8 TS at a time; modules representative of the RR protocol layers (GPRS_MS_RR) 43b, of RLC/MAC layer (GPRS_MS_RLCMAC) 44b, of LLC layer (GPRSMS_LLC) 45b, of SNDCP layer (GPRSMS_SNDCP) 46b, of NL layer (GPRS_MS_NL) 47b, and of application layer APPLICATION (GPRS_MS APP) 48b, and data traffic generator (GPRS_MS_PCG) 49b, respectively, as will be described in detail below, with reference to FIG. 3, with notations in the UML symbology of known type.

Module GPRS_MS_PHY module 42b is capable of implementing the physical layer of the protocol of the GPRS mobile terminal. In particular, Module GPRS MS_PHY 42b is capable of simulating the following functionalities:

power level control of the mobile; access to common/dedicated radio resources;
usage of assigned Time Slots (TS); and
interference measurements.

Module GPRS_MS_RR 43b is capable of implementing the access to circuit radio resources, assigned to the mobile terminal on the basis of input data 35 or of configuration data. Module GPRS_MS_RLCMAC 44b is capable of implementing the RLC (Radio Link Control) layer and "MAC" (Medium Access Control) layer for simulating the data transmission/reception in the "packet mode" through radio resources.

In particular, module GPRS_MS_RLCMAC 44b is capable of simulating all the functionalities covered by the GPRS Standard, such as for instance:

dynamic seizure of radio channels; usage of an individual time slot in multiplexing or sharing with other mobile terminals;
control of transmission errors through ARQ (Automatic Repeat reQuest) technique;
release of a radio channel in favor of an incoming voice call; and
simultaneous use of more channels.

Module GPRS_MS_LLC, 45b, is capable of implementing the "LLC" (Logical Link Control) layer.

In particular, module GPRS_MS_LLC 45b is capable of simulating the reception of data packets from the higher layer (SNDCP protocol), the segmentation or splitting of the same data packets, and the transfer (delivery) to the lower layer (RLCMAC protocol) or vice versa.

Module GPRS_MS_SNDCP 46b, is capable of implementing protocol layer "SNDCP" (Sub-Network Dependent Convergence Protocol).

In particular, module GPRS_MS_SNDCP 46b is capable of simulating the segmentation of data packets coming from the higher layer "NL" and the transfer to the lower layer of protocol "LLC", and vice versa.

The GPRS_MS_NL module, 47b is capable of implementing protocol layer "NL" (Network Layer) of the GPRS terminal. In particular, GPRS_MS_NL module 47b is capable of simulating the following functionalities:

reception of data packets from the "APP" layer;
segmentation or organization of data into data packets of smaller sizes (new data packets) addition to the new packets of a header containing information on how to reassemble the initial packettransfer of the new data packets to the lower layer "NSDCP", or the inverse functionalities for data packets coming from the lower layer "SNDCP".

Module GPRS_MS_APP, 48b, is capable of implementing the Application layer" of the GPRS terminal.

Module GPRS_MS_PCG 49b is capable of implementing the functionality of generation of data packets of different sizes, in terms of number of bit, and of a determined repeatability following the time distribution of generation.

In particular, module GPRS_MS_PCG 49b is capable of simulating in a statistical way, on the basis of input data 35, the data traffic of the GPRS terminal.

As will be explained in detail, by virtue of the object architecture, device MS 41, as a function of appropriate input data 35, is capable of simulating, according to one of the characteristics of the present invention, the behavior of cellular phones within networks of GSM type, GPRS type or of a mixed type.

Obviously, as will become apparent to those skilled in the art, the above described architecture, being modular, can be extended through the introduction of additional types of MS device, such as for instance MS devices of UMTS type, or of other types of devices, and therefore it easily allows the integrated simulation of different types of systems for mobile radio apparatuses.

The generic device BTS 51, incorporates, according to the present embodiment, modules representative of protocol layers managed by such type of device.

Figure 4:
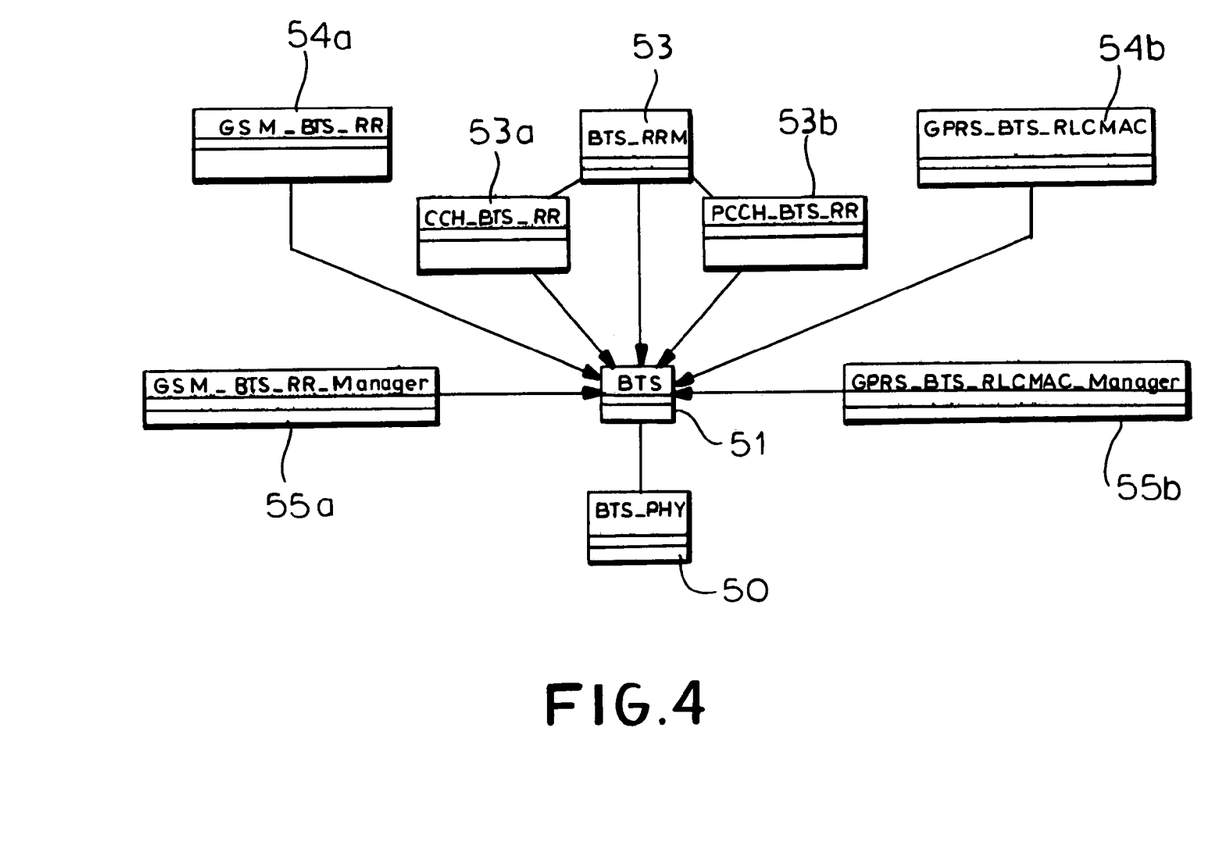

In particular, device BTS 51 comprises modules representative of the physical layer protocols (BTS_PHY) 50, of the RRM layer protocols (BTS_RRM module) 53, of the CCHRR layer protocols (CCH_BTS_RR module) 53*a*, of the PCCHRR layer protocols (PCCH_RR module), 53*b*, of the RLCMAC layer protocols, GPRS_BTS_RLCMAC module 54*b*, and GPRS_BTS_RLCMAC_Manager 55*b*, respectively, of the RR layer protocols, module GSM BTS_RR 54*a*, and module GSM_BTS_RR_manager 55*a*, respectively, and of the RRM protocol layers (BTS_RRM module) 53, as will be described in detail below, making reference to FIG. 4 denoted in UML symbology of known type.

Module BTS_PHY 50, is capable of implementing the protocol layer PHY (PHYsical Layer) of BTS.

In particular, module BTS_PHY 50 is capable of simulating the following functions:
 power level control of BTS; and
 access to common or dedicated channels for services on a circuit basis.

Module CCH_BTS_RR 53*a*, is capable of implementing the CCHRR (Common CHannel Radio Resource) protocol layer of the BTS corresponding to the management of the access to the radio resource of the common channel for circuit switched services.

Module PCCH_BTS_RR 53*b*, is capable of implementing the PCCHRR (Packet Common CHannel Radio Resource) protocol layer of the BTS corresponding to the management of the access to the radio resource of the channels for "packet" services.

Module GPRS_BTS_RLCMAC 54*b* is capable of implementing the RLCMAC (Radio Link Control/Medium Access Control) protocol layer of the BTS.

In particular, module GPRS_BTS_RLCMAC 54*b* is capable of simulating the access to the packet radio resources by a user and the re-transmission of wrong data received. According to a characteristic of the present invention, during the simulation the object module corresponding to module GPRS_BTS_RLCMAC 54*b* is allocated into the memory of the work station 10 (FIG. 1) in a number equal to the GPRS users being active at a given instant of the simulation (FIGS. 1, 2 and 3).

Module GPRS_BTS_RLCMAC_Manager 55*b* is capable of managing the allocation into and the release (de-allocation from the memory) of the various GPRS_BTS_RLCMAC 54*b* corresponding to the active GPRS users.

Module GSM_BTS_RR 54*a* is capable of implementing the RR (Radio Resource) protocol layer of the BTS.

In particular, module GSM_BTS_RR 54*a* is capable of simulating the access to circuit switched radio resources by a user.

According to a characteristic of the present invention, during the simulation, the object module corresponding to module GSM_BTS_RR 54*a* is allocated into the memory of the work station in a number equal to the GSM users being active in a cell at a given instant of the simulation (FIGS. 2, 3, and 4).

Module GSM_BTS_RR_Manager 55*a* is capable of managing the allocation into and the release (de-allocation) from the memory of the various GSM_BTS_RR 54*a* corresponding to the active GSM users.

Module BTS_RRM 53, as an additional characteristic of the present invention, is capable of implementing the RRM (Radio Resource Management) protocol layer of the BTS.

In particular, module BTS_RRM 53 is capable of managing the allocation of the radio resources to the GSM and GPRS users active at a given instant of the simulation.

According to a first characteristic, module BTS_RRM 35 is such as to allow the simulation of a network in which different systems, like for instance GSM and GPRS, are used.

According to a second characteristic, module BTS_RRM 53, according to the present embodiment, has different implementation forms depending on the technological characteristics of the BTS's.

As is known, the RRM entity is not completely defined through the GSM and GPRS standards; thus the implementation of modules allowing its simulation must take into account the possible technological alternatives, such as the management algorithms of the radio resources according to the specifications of a given BTS manufacturer.

By virtue of the architecture according to the present invention, the technological variability may be managed by using in particular specific BTS_RRM modules 53 and without modifying the characteristics of simulator 30.

Obviously, the specific modules BTS_RRM 53 will give rise to integrated and high performance simulation object modules in terms of simulation times, even if diversified.

Figure 5:
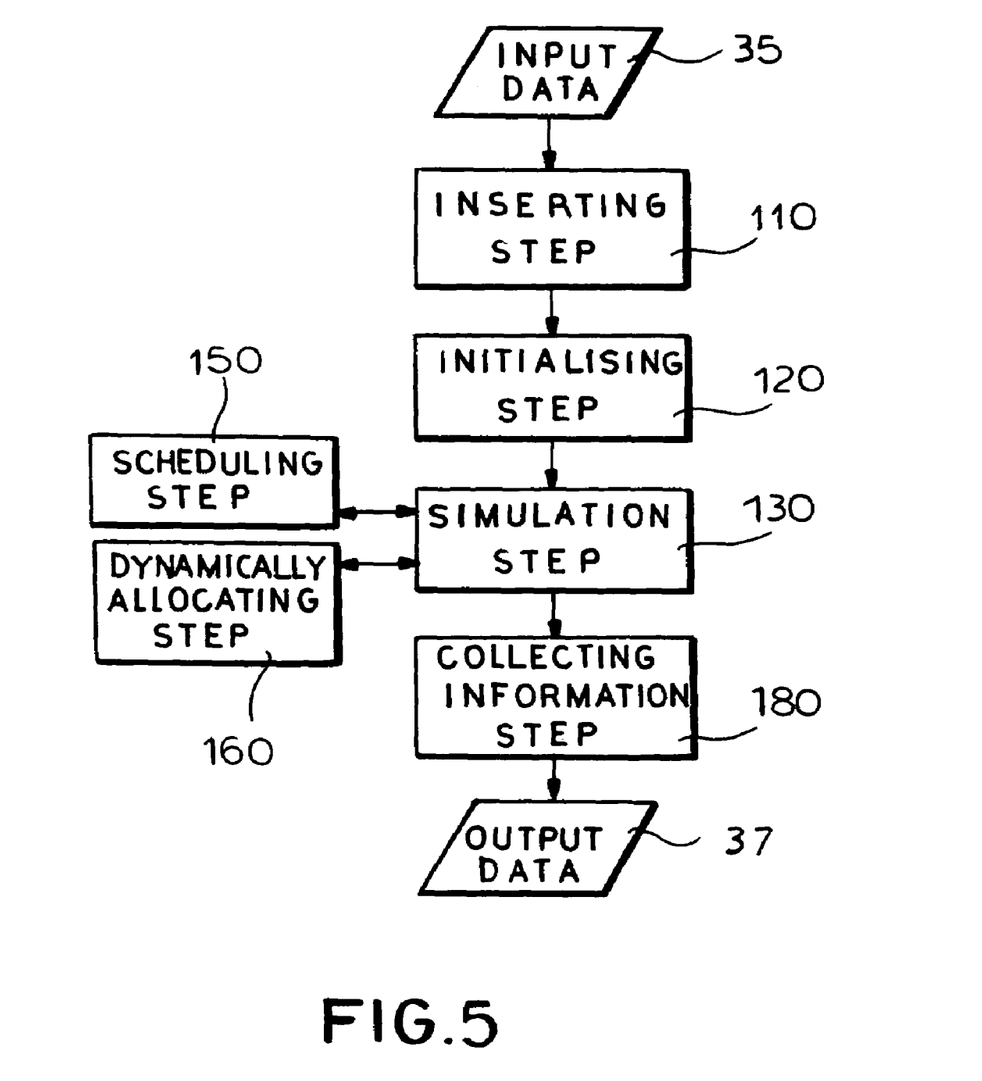
FIG. 5 depicts a flow chart of the method according to the invention.

The operation of the system described so far is highlighted hereinafter, making reference to the flow chart of FIG. 5.

During a first step (scenario definition), a given file of configuration parameters (input data) 35 is loaded on the work station 10 (FIGS. 1, 2, 3, 4, and 5), for instance of text type, representative of the so called simulation scenario.

Input data 35 comprises, for instance: the average number of mobile telephone sets and the number of radio base stations being present during the simulation; references to data banks representative of the territory on which the simulation is to be performed and having corresponding devices which can be configured on the basis of such data banks.

In a second step (initialization) 120, the parameter manager processing module, 31*a*, after a formal check of input data, 35, carries out the allocation into the memory of the work station 10 of a number of devices and related object modules forming the devices, on the basis of input data 35.

In such a step 120, the devices and related components are initialized through parameters and variables as a function of input data 35, such as attenuation parameters, configuration parameters, etc, so that the initial scenario of the simulation is determined.

Upon the sequential completion of steps 110 and 120, during a third step (simulation) 130, simulation engine 31 activates the actual simulation of the network for mobile radio apparatuses.

For instance the simulation 130 comprises:
 activation of the mobile sets allocated into the memory of the work station at a rate statistically defined on the basis of input data;
 exchange of information or messages between the allocated mobile sets and the devices, for instance of BTS type, involved in the information exchange with the mobile sets.

The simulation 130 goes on by successive steps and, although each operation is carried out by the devices in a sequential way in the CPU of the work station 10, if unique, each simulation step is obviously managed by simulation engine, 31, and analyzed, considering the activity of the devices as a contemporary activity, performed in parallel, as is customary with the simulation tools.

During step 130, against each simulation step, engine 31 activates the event scheduler module 31*b*, (event scheduling step, 150) so as to schedule the events of information exchange or messages among the devices and/or the devices and/or their components.

Step 150 schedules in terms of time the activity of the network of mobile radio apparatuses on the basis of parameters defined in input data 35 as well as collected during the simulation steps.

Furthermore, during step 130, at each simulation step, engine 31 activates, if necessary, the factory manager module, 31c, (memory optimization step 160) so as to optimize the allocation and access times to the RAM of the work station 10. Step 160 takes into account the variations in terms of active devices at each simulation step, and allows for instance keeping allocated, for a defined time, object modules internal to BTS 51, such as the GSM_BTS_RR modules 54a, with a view to a possible re-use in subsequent steps of step 130.

Finally, during step 130, against each simulation step, engine 31 activates the statistic manager module, 31d (data collection step 180) so as to collect from the various devices involved in the simulation step, data concerning, for instance, number of active users;
resources assigned in terms of time slots, channels, frequencies;

and to store the detailed data, this being an additional characteristic of the present invention, for future quantitative and statistical analyses.

In any case, step 180, through the statistic manager module, 31d, is also capable of compiling, once step 130 has been completed, and on the basis of data collected during the various simulation steps, various statistics concerning values for parameters such as:

mean values of call delays;
number of handled calls
number of blocked calls;
variance on service mean values; and
confidence or reliability of the mean computed values and is capable of generating as output, in the form of output data 37, tables and graphs which can be displayed on display 12 of the work station 10.

It is evident that modifications or variations to the above description are possible as far as dimensions, shapes, materials, components, circuit elements, connections and contacts, or details relating to the circuits lay-outs, to the execution herein illustrated and to its method of operation, however without departing from the spirit and scope of the invention, as defined in the appended claims.

The invention claimed is:

1. A system for simulating a network for mobile radio apparatuses, the system comprising:
   a work station having
      data inputs capable of inserting data representative of a network scenario and
      data outputs for making available data representative of results of the simulation of said network; and
   a simulation environment associated with said work station and capable of simulating said network on the basis of said network scenario and of generating and sending to said data outputs the data representative of said results, said simulation environment comprising:
      first objects representative of devices and/or physical elements belonging to said network to be simulated and having network devices corresponding to a plurality of network typologies for mobile radio apparatuses and/or radio protocols, capable of being selectively activated by second objects, and including a plurality of modules representative of protocol layers of the simulated network; and
      second objects representative of processing modules separate from said first objects and capable of conditioning and selectively activating said first objects on the basis of said network scenario to simulate said network.

2. The system according to claim 1, wherein said first objects each further comprise:
   respective technological devices that can be alternatively implemented in said simulation environment and each corresponding to one of a plurality of technologies.

3. The system according to claim 2 wherein the technological devices include modules representative of a protocol layer of the simulated network.

4. The system according to claim 1, wherein said network scenario comprises:
   parameters indicative of the number of devices of said network to be simulated; and/or
   parameters indicative of the traffic quantity of said network to be simulated; and/or
   parameters indicative of the type of services of said network to be simulated.

5. The system according to claim 1 wherein said second objects each further comprise:
   an initialization object capable of interpreting said network scenario and of initializing said first objects at determined values.

6. The system according to claim 1 wherein said second objects each further comprise
   an event scheduler module capable of activating at determined instants said first objects.

7. The system according to claim 6, wherein said second objects each further comprise:
   memory manager module capable of dynamically storing into said work station said first objects cooperating with said event scheduler module.

8. The system according to claim 1 wherein said second objects each further comprise:
   a result generation module capable of:
      collecting information from said first objects during the simulation of said network; and
      generating at the output of said data output means said results on the basis of said information.

9. The system according to claim 8, wherein said results comprise:
   detailed results corresponding to said information collected during the simulation; and/or
   statistical results corresponding to statistical processing operations on said information.

10. A method for simulating the behavior of a network for mobile radio apparatuses, the method comprising the steps of:
   inserting at the input of a work station a simulation scenario of a network for mobile radio apparatuses;
   simulating said network on the basis of said scenario and through an integrated simulation environment including:
      first objects representative of devices and/or physical elements belonging to said network to be similated;
      second objects representative of processing modules, separate from said first objects and capable of conditioning and selectively activating said first objects on the basis of said simultion scenario, the simulating step including allocating into the memory of the work station comprised in the first devices network devices corresponding to a plurality of mobile radio network apparatuses and/or radio protocols and capable of being selectively activated by the second objects on the basis of the simulation scenario and including a plurality of modules representative of protocol layers of the simulated network.

11. The method according to claim 10 wherein the simulation step further comprises the step of:

initializing said first objects at initial values determined by said simulation scenario.

12. The method according to claim 10, wherein the simulation step further comprises the step of:

scheduling the activation of said first objects at determined instants.

13. The method according to claim 12 wherein the simulation step further comprises the step of:

dynamically allocating into the memory of said work station said first objects on the basis of said scheduling step.

14. The method according to claim 10 further comprising the step of:

collecting information from said first objects during the simulation of said network; and of generating at the output from said work station and on the basis of said information, results of the simulation comprising:

detailed results corresponding to said information and/ or statistical results corresponding to statistical processes carried out on said information.

* * * * *